US 8,790,168 B1

(12) United States Patent
Wolters et al.

(10) Patent No.: US 8,790,168 B1
(45) Date of Patent: Jul. 29, 2014

(54) METHOD TO DETECT AND SCORE CHURN IN ONLINE SOCIAL GAMES

(75) Inventors: Hans Wolters, Mountain View, CA (US); Jim Baer, San Francisco, CA (US); Girish Keswani, Santa Clara, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/436,315

(22) Filed: Mar. 30, 2012

Related U.S. Application Data

(60) Provisional application No. 61/588,589, filed on Jan. 19, 2012.

(51) Int. Cl.
*A63F 13/85* (2014.01)
*A63F 13/79* (2014.01)

(52) U.S. Cl.
USPC .......................................... 463/1

(58) Field of Classification Search
USPC ................................ 463/43, 1, 42
See application file for complete search history.

(56) References Cited

U.S. PATENT DOCUMENTS

| | | | |
|---|---|---|---|
| 8,194,830 B2 * | 6/2012 | Chakraborty et al. | ... 379/112.01 |
| 8,249,231 B2 * | 8/2012 | Chakraborty et al. | ... 379/112.01 |
| 2005/0251408 A1 * | 11/2005 | Swaminathan et al. | .......... 705/1 |
| 2007/0156673 A1 * | 7/2007 | Maga et al. | .......... 707/5 |
| 2007/0185867 A1 * | 8/2007 | Maga et al. | .......... 707/6 |
| 2009/0132347 A1 * | 5/2009 | Anderson et al. | .......... 705/10 |
| 2011/0218045 A1 * | 9/2011 | Williams et al. | .......... 463/42 |

OTHER PUBLICATIONS

Jaya Kawale, et. al., Churn Prediction in MMORPGs: A Social Influence Based Approach, Department of Computer Science and Engineering University of Minnesota, May 20, 2009.*

* cited by examiner

*Primary Examiner* — Bach Hoang
(74) *Attorney, Agent, or Firm* — Schwegman Lundberg & Woessner, P.A.

(57) ABSTRACT

A method and a system for predicting churn of a player of an online game is described. Online engagements of a group of players of the online game are monitored during a churn prediction model training period. Online engagement scores for the group of players are computed within a periodic number of days within the churn model training period. A weighted exponential moving average of the online engagement scores of the group of players of the online game is computed during the churn model training period. The weighted exponential moving average is used to determine an online engagement threshold value of a churn prediction model for the online game. The online engagement threshold value is applied to a weighted exponential moving average of a player during an observation period to determine a churn probability of the player within a prediction period.

20 Claims, 8 Drawing Sheets

METHOD TO DETECT AND SCORE CHURN IN ONLINE SOCIAL GAMES

CROSS-REFERENCE TO RELATED APPLICATION

The present application claims the benefit of U.S. Provisional Patent Application Ser. No. 61/588,589, filed Jan. 19, 2012, entitled "METHOD TO DETECT AND SCORE CHURN IN ONLINE SOCIAL GAMES", which is incorporated herein by reference in its entirety.

TECHNICAL FIELD

The present disclosure generally relates to games and applications in general and, in particular embodiments, to computer-implemented, online social games.

BACKGROUND

Online social games are becoming widespread. The success of an online social game depends on the number of players and how often these players visit the online social game. As such, the retention of online players to visiting the online social games is an important factor towards the success of the online social games.

BRIEF DESCRIPTION OF THE DRAWINGS

The present invention is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

A method and a system for predicting churn of a player of an online game is described. Online engagements of a group of players of an online game are monitored during a churn prediction model training period. The churn prediction model training period includes the last first number of days (e.g., last 90 days). Online engagement scores for the group of players are computed based on a number of days the group of players has played on the online game within a periodic number of days (e.g., a week) within the churn model training period (e.g. last 90 days). Exponential weights are assigned to the online engagement scores so that a weight of an online engagement score is higher when occurred more recently. The exponential weights are used to compute a weighted exponential moving average of the online engagement scores of the group of players of the online game during the churn model training period (e.g., last 90 days). The weighted exponential moving average of the online engagement scores of the group of players of the online game is used to determine an online engagement threshold value of a churn prediction model for the online game. The online engagement threshold value is applied to a weighted exponential moving average of an online engagement score of a player during an observation period comprising the last second number of days (e.g., last 30 days) to determine a churn probability of the player within a prediction period comprising the next third number of days (e.g., the next 30 days).

Game Networking System

Figure 1:
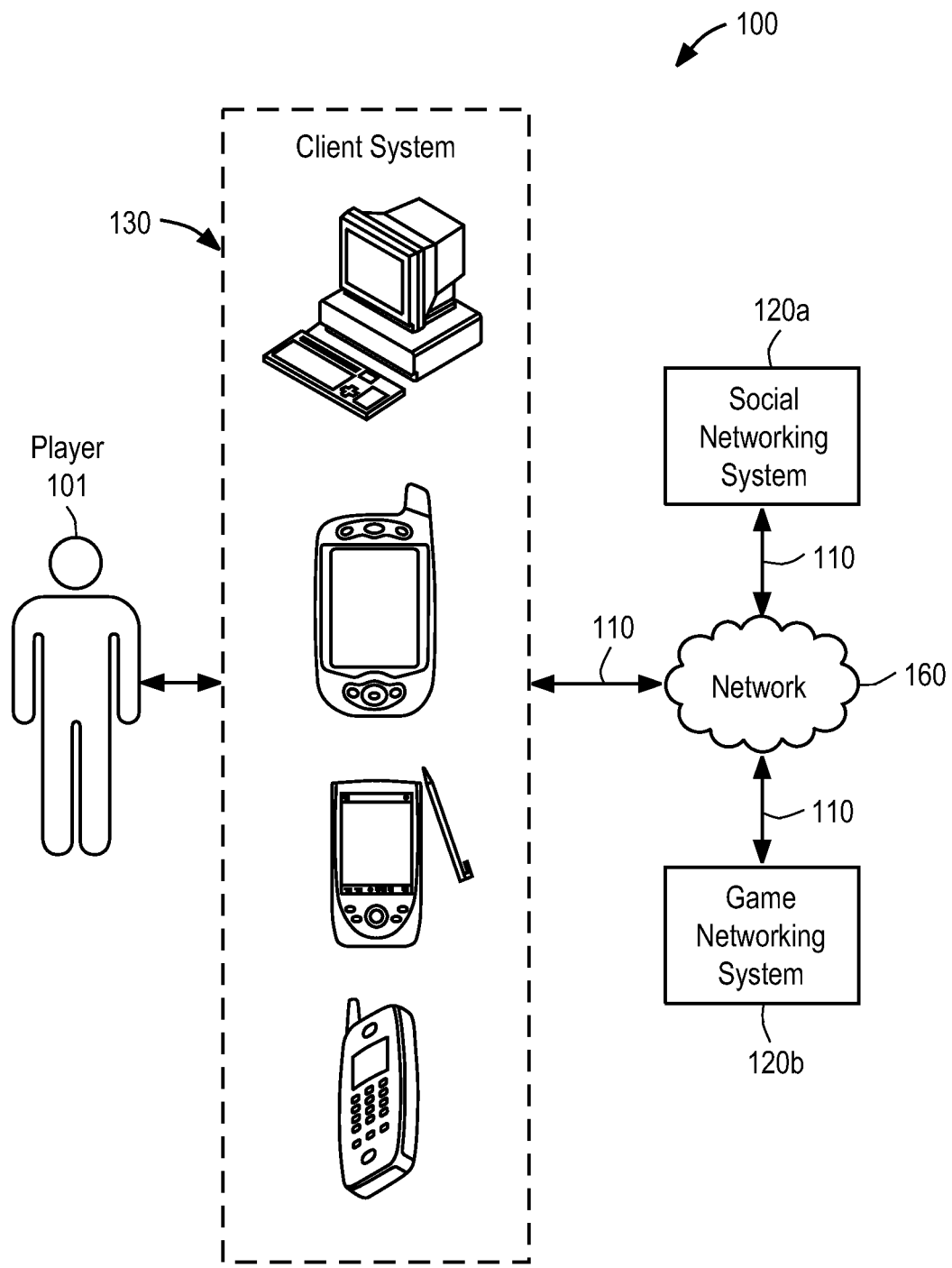
FIG. 1 illustrates an example embodiment of a system for implementing particular disclosed embodiments.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social network system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social networking system 120a, game networking system 120*b*, client system 130, and network 160, this disclosure contemplates any suitable number of players 101, social networking systems 120*a*, game networking systems 120*b*, client systems 130, and networks 160. As an example and not by way of limitation, system 100 may include one or more game networking systems 120*b* and no social networking systems 120*a*. As another example and not by way of limitation, system 100 may include a system that comprises both social networking system 120*a* and game networking system 120*b*. Moreover, although FIG. 1 illustrates a particular arrangement of player 101, social networking system 120*a*, game networking system 120*b*, client system 130, and network 160, this disclosure contemplates any suitable arrangement of player 101, social network system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120*a*, game networking system 120*b*, client system 130, and network 160, this disclosure contemplates any suitable connections between player 101, social networking system 120*a*, game networking system 120*b*, client system 130, and network 160. As an example and not by way of limitation, in particular embodiments, client system 130 may have a direct connection to social networking system 120*a* or game networking system 120*b*, bypassing network 160.

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b*, which can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Game Systems, Social Networks, and Social Graphs

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N-1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120*a* or game networking system 120*b*). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120*b*, which is managed by the game operator. In other embodiments, the social graph is part of a social networking system 120*a* managed by a third-party (e.g., Facebook, Friendster, Myspace). In yet other embodiments, player 101 has a social network on both game networking system 120*b* and social networking system 120*a*, wherein player 101 can have a social network on the game networking system 120*b* that is a subset, superset, or independent of the player's social network on social networking system 120*a*. In such combined systems, game network system 120*b* can maintain social graph information with edge type attributes that indicate whether a given friend is an "in-game friend," an "out-of-game friend," or both. The various embodiments disclosed herein are operable when the social graph is managed by social networking system 120*a*, game networking system 120*b*, or both.

Figure 2:
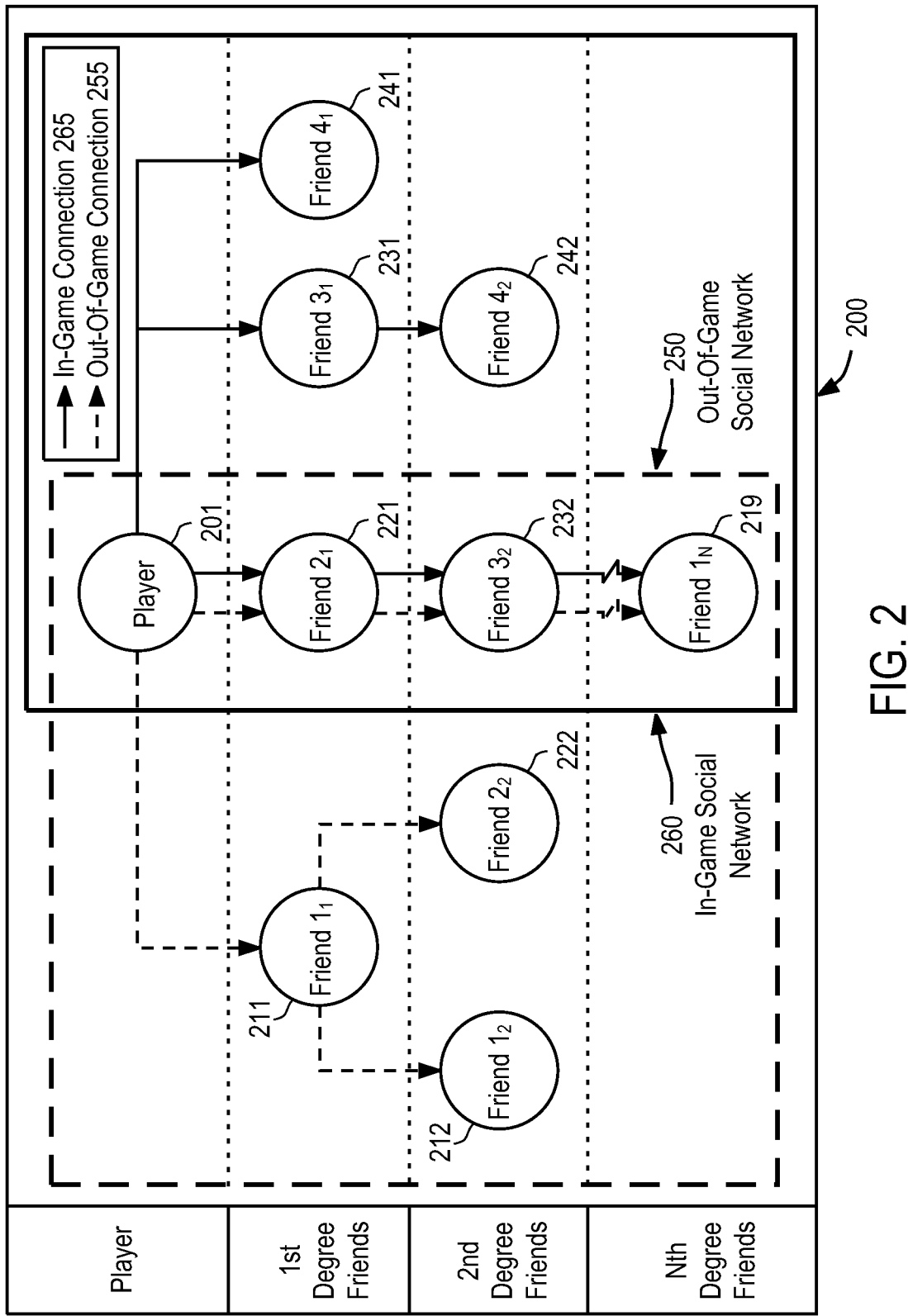
FIG. 2 illustrates an example embodiment of a social network.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by a game networking system, which can be accessed over any suitable network with an appropriate client system. A player may have a game system account on game system, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game system and merely accessed via the third-party website. The embedded online game can be hosted solely on a server of game system or using a third-party vendor server. In addition, any combination of the functions of the present disclosure can be hosted on or provided from any number of distributed network resources. For example, one or more executable code objects that implement all or a portion of the game can be downloaded to a client system for execution.

Figure 3:
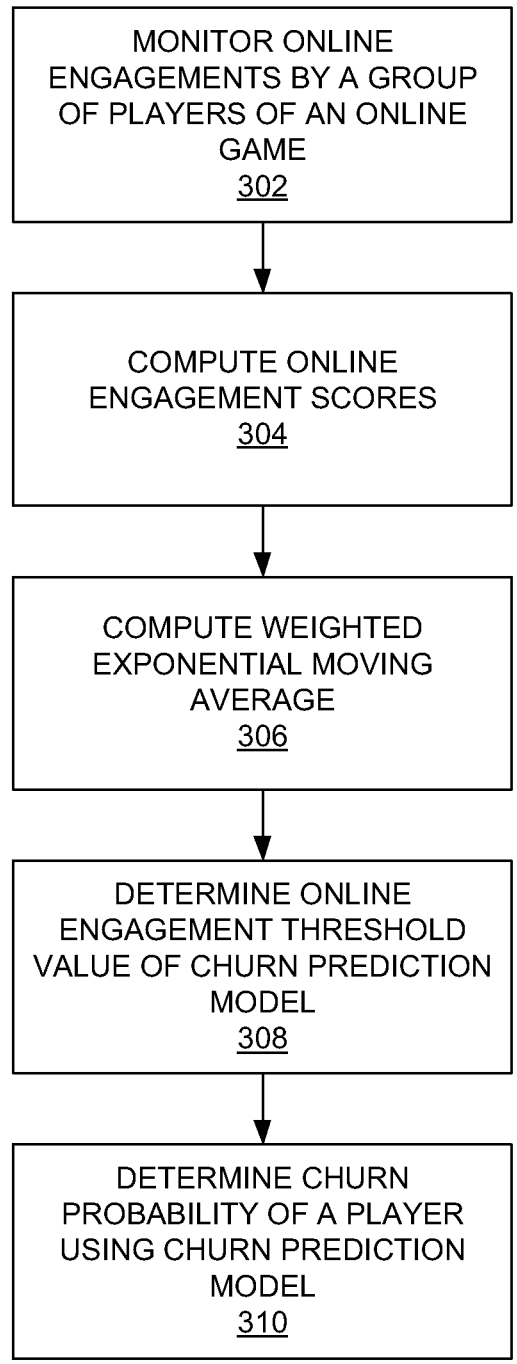
FIG. 3 illustrates a flow diagram of an example embodiment of a method for detecting and scoring churn in online social games.

FIG. 3 illustrates a flow diagram of an example of a method for detecting and scoring churn in an online social game. At operation 302, online engagements of a group of players of an online game are monitored during a churn prediction model training period. The churn prediction model training period includes the last first number of days (e.g., last 90 days). For example, a player's engagement may include the number of days the player has played or accessed the online game for each week for a period of 90 days. It should be noted that players from the group of players have already installed the online game during the churn model training period. As such, the maximum online engagement of a player may be seven days a week for the last 90 days. The minimum online engagement of a player may be zero days a week for the last 90 days. Also, the online engagement may vary week by week.

At operation 304, online engagement scores for the group of players are computed based on a number of days the group of players has played on the online game within a periodic number of days (e.g., a week) within the churn model training period (e.g. last 90 days). A score is assigned based on the online engagement. For example, a score of 1 may be assigned when the player has played the online game one day out of a week or a score of 4 may be assigned when the player has played the online game one day a week for four weeks.

Figures 8, 9:
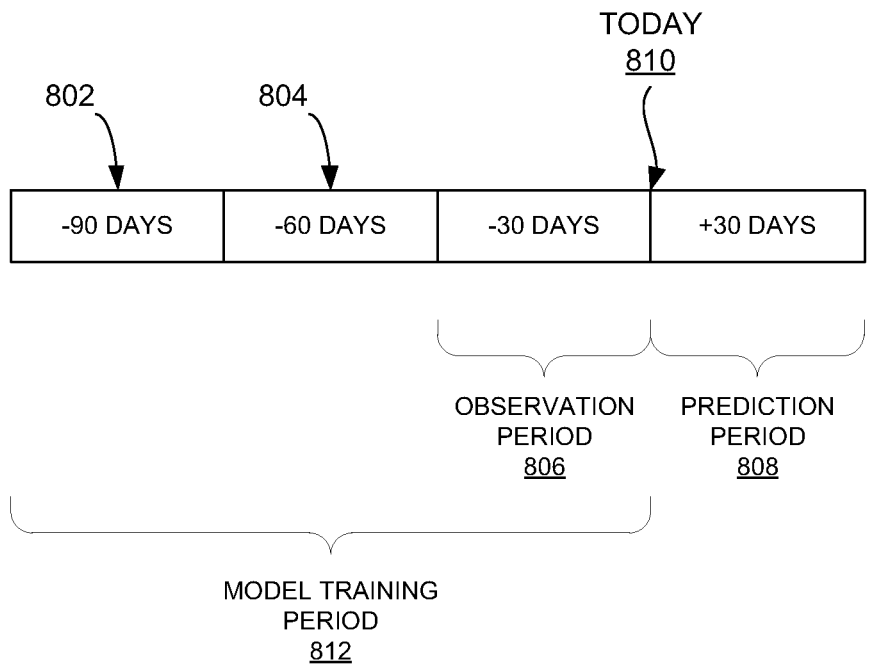
FIG. 8 is a block diagram illustrating an example of a timeline for churn prediction.
FIG. 9 illustrates an example of a table illustrating the weighting scheme with their corresponding online engagement scores.

At operation 306, exponential weights are assigned to the online engagement scores so that a weight of an online engagement score is higher when occurred more recently. The exponential weights are used to compute a weighted exponential moving average of the online engagement scores of the group of players of the online game during the churn model training period (e.g., last 90 days). The weight is chosen so that a player's engagement score is ranked higher when it occurs more recently as opposed to a player who has strong early engagement but recently tapered off. FIG. 9 illustrates an example of a table 900 illustrating the weighting scheme with their corresponding online engagement scores. Column 902 represents scores of players in the group from 4 weeks prior. Column 904 represents scores of players in the group from 3 weeks prior. Column 906 represents scores of players in the group from 2 weeks prior. Column 908 represents scores of the players the directly preceding week. Column 910 represents the weighted scores of players in the group.

At operation 308, the weighted exponential moving average of the online engagement scores of the group of players of the online game is used to determine an online engagement threshold value of a churn prediction model for the online game. The churn prediction model is generated by training a simple naïve Bayesian classifier that computes the posterior probabilities of a player to be a likely churner based on the learned distributions as well as the priors. For example, the prior probabilities turn out to be 60% for a user to stay in the game and 40% for a user to churn. In that example, the churn model derives a threshold value of 2.4 for the engagement score, meaning that the churn model predicts a player to be a churner if the engagement score is below that threshold value of 2.4.

In one embodiment, the churn score computation algorithm may be as follows:

$$\text{Churn-score} = C.w1*0.4 + (0.6)*((C.w2*0.4) + (0.6)*(C.w3*0.4 + (0.6)*(C.w4*0.4)))$$

where w1=s number of days played in previous week, w2=s number of days played 2 weeks ago, w3=s number of days played 3 weeks ago, w4=s number of days played 4 weeks ago At operation 310, the online engagement threshold value is applied to a weighted exponential moving average of an online engagement score of a player during an observation period comprising the last second number of days (e.g., last 30 days) to determine a churn probability of the player within a prediction period comprising the next third number of days (e.g., the next 30 days). For example, a player having a weighted exponential moving average online engagement score of 2.1 is likely to churn because the score is less than the threshold value of 2.4.

In one embodiment, a probability of whether the player is likely to churn within the next 30 days may be derived by comparing the score of the player and the threshold value.

To illustrate the different time period, FIG. 8 is a block diagram illustrating an example of a timeline for churn prediction. The model training period 812 is before the present date, today 810. The model training period 812 may include for example 90 days. The time period 802 represents a one month period 60 to 90 days before today 810. The time period 804 represents a one month period 30 to 60 days before today 810. The observation period 806 represents a one month period 0 to 30 days before today 810. The observation period 806 is associated with the player. The model training period 812 is associated with the group of players. The prediction period 808 represents the next 30 days after today 810.

Figure 4:
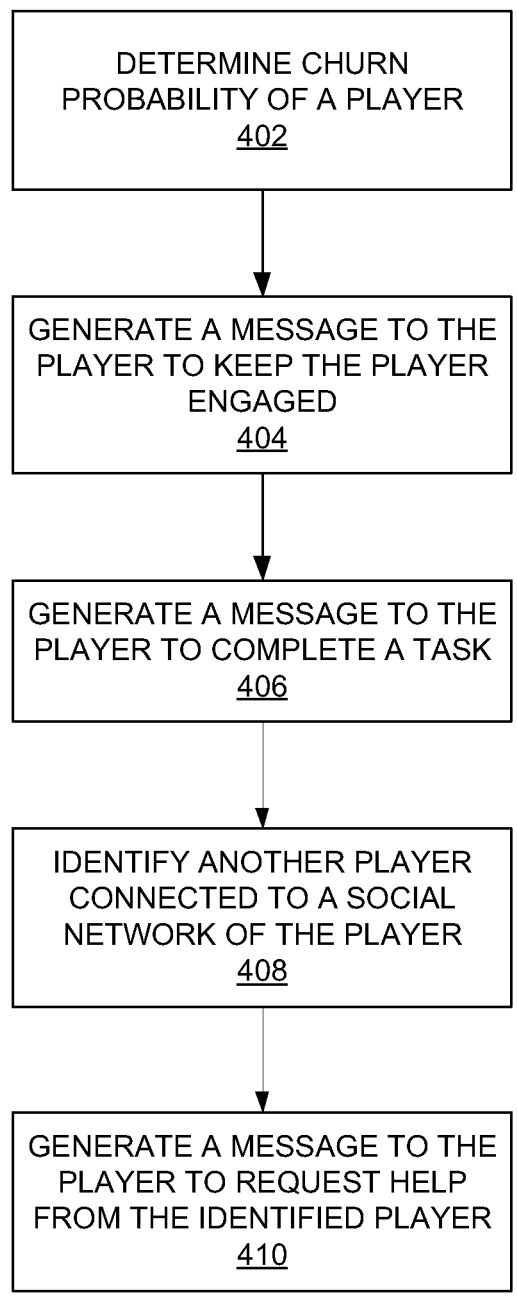
FIG. 4 illustrates a flow diagram of another example embodiment of a method for increasing retention using churn prediction in online social games.

FIG. 4 illustrates a flow diagram of an example of a method for increasing retention using churn prediction.

At operation 402, a churn probability of a player with the churn rate model applied to an online engagement history of the player is determined using the process as previously described with respect to FIG. 3.

At operation 404, a message is generated to the player to keep the player engaged in the online game when the churn probability of the player exceeds a predetermined churn probability threshold.

At operation 406, a message is generated to the player to request the player to complete a task in the online game when the churn probability of the player exceeds a predetermined churn probability threshold. For example, the player is invited to complete a new easier task or is given clues to complete an existing task.

At operation 408, another player connected to the player via a social network is identified to help the player complete a task in the online game when the churn probability of the player exceeds a predetermined churn probability threshold.

At operation 410, a message is generated to the player to request help from the other player to complete the task in the online game of the player.

Data Flow

Figure 5A:
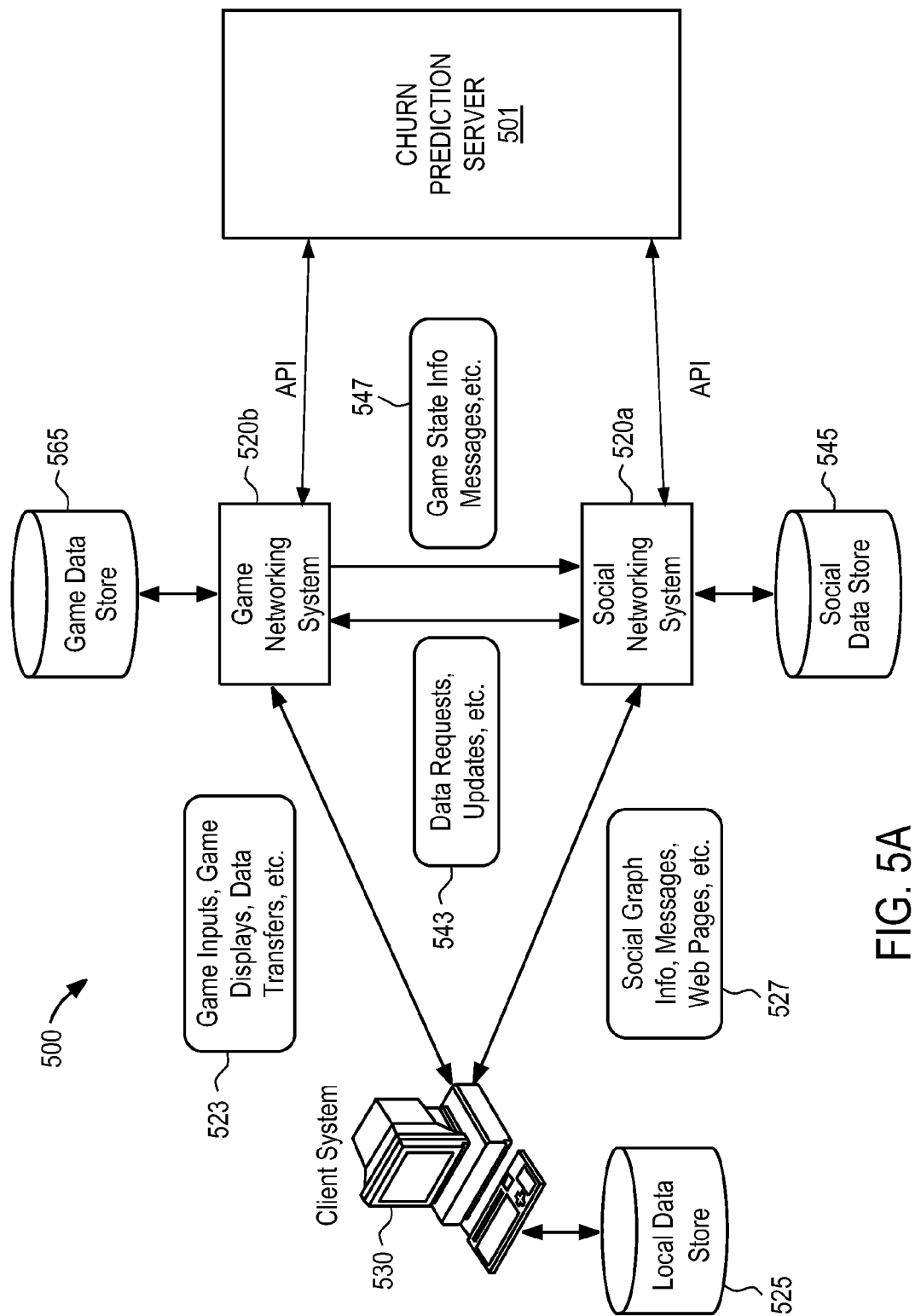
FIG. 5A illustrates an example embodiment of a data flow in a system.

FIG. 5A illustrates an example data flow between the components of system 500. In particular embodiments, system 500 can include client system 530, social networking system 520a, and game networking system 520b. The components of system 500 can be connected to each other in any suitable configuration, using any suitable type of connection. The components may be connected directly or over any suitable network. Client system 530, social networking system 520a, and game networking system 520b can each have one or more corresponding data stores such as local data store 535, social data store 545, and game data store 565, respectively. Social networking system 520a and game networking system 520b can also have one or more servers that can communicate with client system 530 over an appropriate network. Social networking system 520a and game networking system 520b can have, for example, one or more internet servers for communicating with client system 530 via the Internet. Similarly, social networking system 520a and game networking system 520b can have one or more mobile servers for communicating with client system 530 via a mobile network (e.g., GSM, PCS, Wi-Fi, WPAN, etc.). In some embodiments, one server may be able to communicate with client system 530 over both the Internet and a mobile network. In other embodiments, separate servers can be used.

Client system 530 can receive and transmit data 523 to and from game networking system 520b. This data can include, for example, webpages, messages, game inputs, game displays, HTTP packets, data requests, transaction information, updates, and other suitable data. At some other time, or at the same time, game networking system 520b can communicate data 543, 547 (e.g., game state information, game system account information, page info, messages, data requests, updates, etc.) with other networking systems, such as social networking system 520a (e.g., Facebook, Myspace, etc.). Client system 530 can also receive and transmit data 527 to and from social networking system 520a. This data can include, for example, webpages, messages, social graph information, social network displays, HTTP packets, data requests, transaction information, updates, and other suitable data.

Communication between client system 530, social networking system 520a, and game networking system 520b can occur over any appropriate electronic communication medium or network using any suitable communications protocols. For example, client system 530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 520b, the BLOB containing the game state for the instance corresponding to the player can be transmitted to client system 530 for use by a client-side executed object to process. In particular embodiments, the client-side executable may be a FLASH-based game, which can de-serialize the game state data in the BLOB. As a player plays the game, the game logic implemented at client system 530 maintains and modifies the various game state parameters locally. The client-side game logic may also batch game events, such as mouse clicks, and transmit these events to game networking system 520b. Game networking system 520b may itself operate by retrieving a copy of the BLOB from a database or an intermediate memory cache (memcache) layer. Game networking system 520b can also de-serialize the BLOB to resolve the game state parameters and execute its own game logic based on the events in the batch file of events transmitted by the client to synchronize the game state on the server side. Game networking system 520b may then re-serialize the game state, now modified, into a BLOB and pass this to a memory cache layer for lazy updates to a persistent database.

With a client-server environment in which the online games may run, one server system, such as game networking system 520b, may support multiple client systems 530. At any given time, there may be multiple players at multiple client systems 530 all playing the same online game. In practice, the number of players playing the same game at the same time may be very large. As the game progresses with each player, multiple players may provide different inputs to the online game at their respective client systems 530, and multiple client systems 530 may transmit multiple player inputs and/or game events to game networking system 520b for further processing. In addition, multiple client systems 530 may transmit other types of application data to game networking system 520b.

In particular embodiments, a computed-implemented game may be a text-based or turn-based game implemented as a series of web pages that are generated after a player selects one or more actions to perform. The web pages may be displayed in a browser client executed on client system 530. As an example and not by way of limitation, a client application downloaded to client system 530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 520a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 530, either caused by an action of a game player or by the game logic itself, client system 530 may need to inform game networking system 520b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 500 is discussed in reference to updating a multi-player online game hosted on a network-addressable system (such as, for example, social networking system 520a or game networking system 520b), where an instance of the online game is executed remotely on a client system 530, which then transmits application event data to the hosting system such that the remote game server synchronizes game state associated with the instance executed by the client system 530.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 530 may include a Flash client. The Flash client may be configured to receive and run Flash application or game object code from any suitable networking system (such as, for example, social networking system 520a or game networking system 520b). In particular embodiments, the Flash client may be run in a browser client executed on client system 530. A player can interact with Flash objects using client system 530 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 530, the Flash client may send the events that caused the game state changes to the in-game object to game networking system 520b. However, to expedite the processing and hence the speed of the overall gaming experience, the Flash client may collect a batch of some number of events or updates into a batch file. The number of events or updates may be determined by the Flash client dynamically or determined by game networking system 520b based on server loads or other factors. For example, client system 530 may send a batch file to game networking system 520b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 530. In particular embodiments, the batch file may be a text file and the name-value pairs may be in string format.

In particular embodiments, when a player plays an online game on client system 530, game networking system 520b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 520b may retrieve the corresponding BLOB from the database to determine the most-recent values of the game-related data. In particular embodiments, while a player is playing the online game, game networking system 520b may also load the corresponding BLOB into a memory cache so that the game system may have faster access to the BLOB and the game-related data contained therein.

Social Networking System 520a and Game Networking System 520b communicate with a Churn Prediction Server 501. An API may be provided to interface both Social Networking System 520a and Game networking system 520b with the Churn Prediction Server 501. The Churn Prediction Server 501 may be configured to analyze data including for example, a frequency of users online engagements in the Social Networking System 520a and/or the Game Networking System 520b. Based on the analysis of the data, the Churn Prediction Server 501 is able to predict whether a user is likely to churn in the Game Networking System 520b and/or the Social Networking System 520a. Furthermore, the Churn Prediction Server 501 can also be configured to provide recommendations to the Game Networking System 520b on how to improve retaining the user/player to continue playing on the Game Networking System 520b.

Figure 5B:
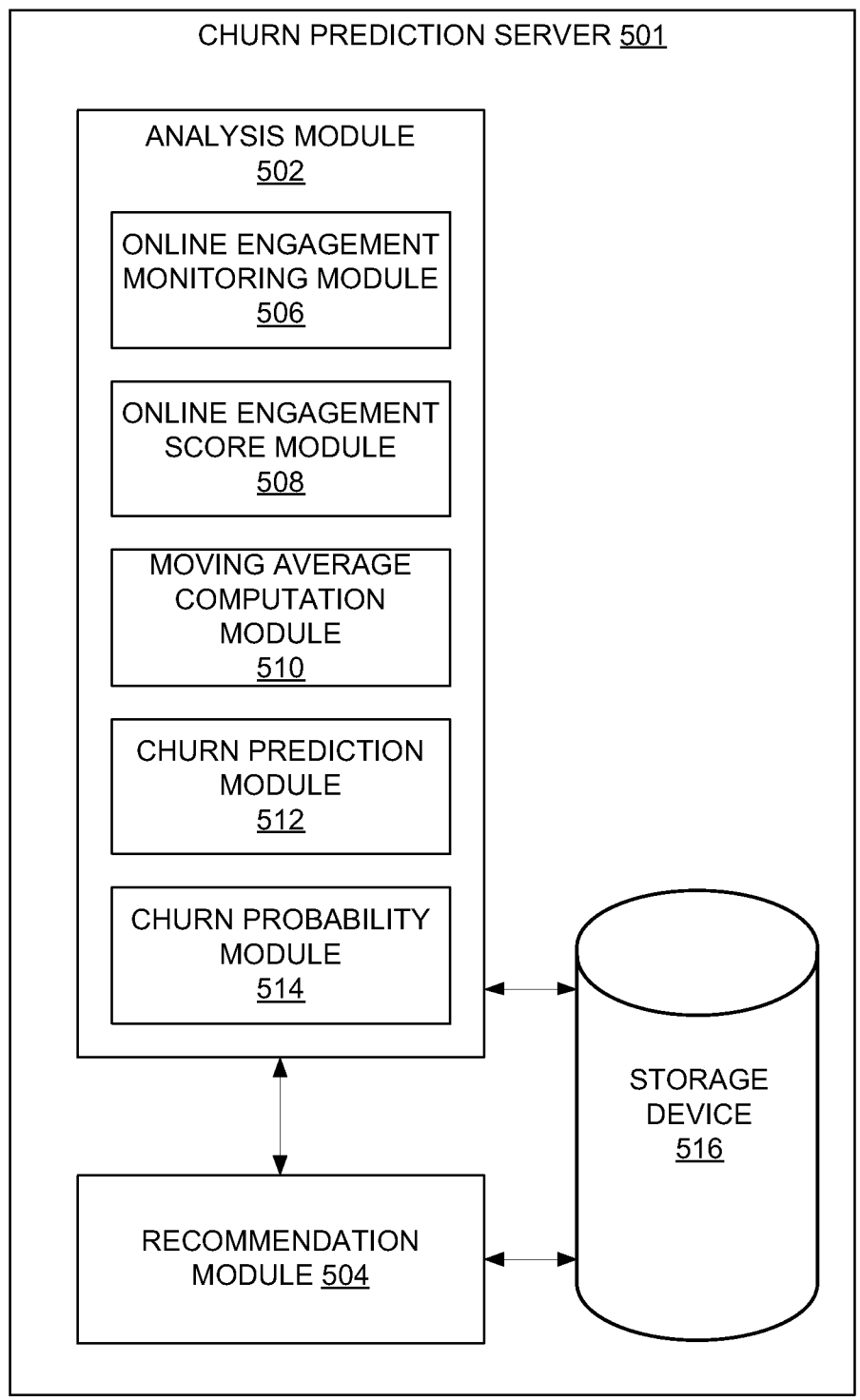
FIG. 5B is an example embodiment of a churn prediction server.

FIG. 5B is an example of the Churn Prediction server 501. The Churn Prediction Server 501 may include an analysis module 502, a recommendation module 504, and a storage device 516. The analysis module 502 is configured to analyze data related to player engagements/interactions on the Game Networking System 520b and/or the Social Networking System 520a. The analysis module 502 includes an online engagement monitoring module 506, an online engagement score module 508, a moving average computation module 510, a churn prediction module 512, and a churn probability module 514.

The recommendation module 504 is configured to provide a recommendation to the Game Networking System 520b on strategies for improving retaining a player on the Game Networking System 520b and increasing the player's online engagements and interactions on the Game Networking System 520b.

The storage device 516 may store data related to the modules 506, 508, 510, 512, 514, and the recommendation module 504 for further analysis. The storage device 516 may store historical trends and baseline values of users based on the data related to user communications and interactions on the Game Networking System 520b and/or the Social Networking System 520a.

The online engagement monitoring module 506 monitors online engagements of a group of players of an online game during a churn prediction model training period, the training period comprising the last first number of days.

The online engagement score module 508 computes online engagement scores for the group of players based on a number of days the group of players has played on the online game within a periodic number of days within the churn model training period.

The moving average computation module 510 assigns exponential weights to the online engagement scores so that a weight of an online engagement score is higher when occurred more recently. The moving average computation module 510 then uses the exponential weights to compute a weighted exponential moving average of the online engagement scores of the group of players of the online game during the churn model training period.

The churn prediction module 512 uses the weighted exponential moving average of the online engagement scores of the group of players of the online game to determine an online engagement threshold value of a churn prediction model for the online game.

The churn probability module 514 applies the online engagement threshold value to a weighted exponential moving average of an online engagement score of a player during an observation period comprising the last second number of days to determine a churn probability of the player within a prediction period comprising the next third number of days.

The storage device 516 stores the weighted exponential moving average of the online engagement scores of the group of players of the online game during the churn model training period, the online engagement threshold value of a churn prediction model for the online game for the churn model training period, and the churn probability of the player within the prediction period.

System and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 6:
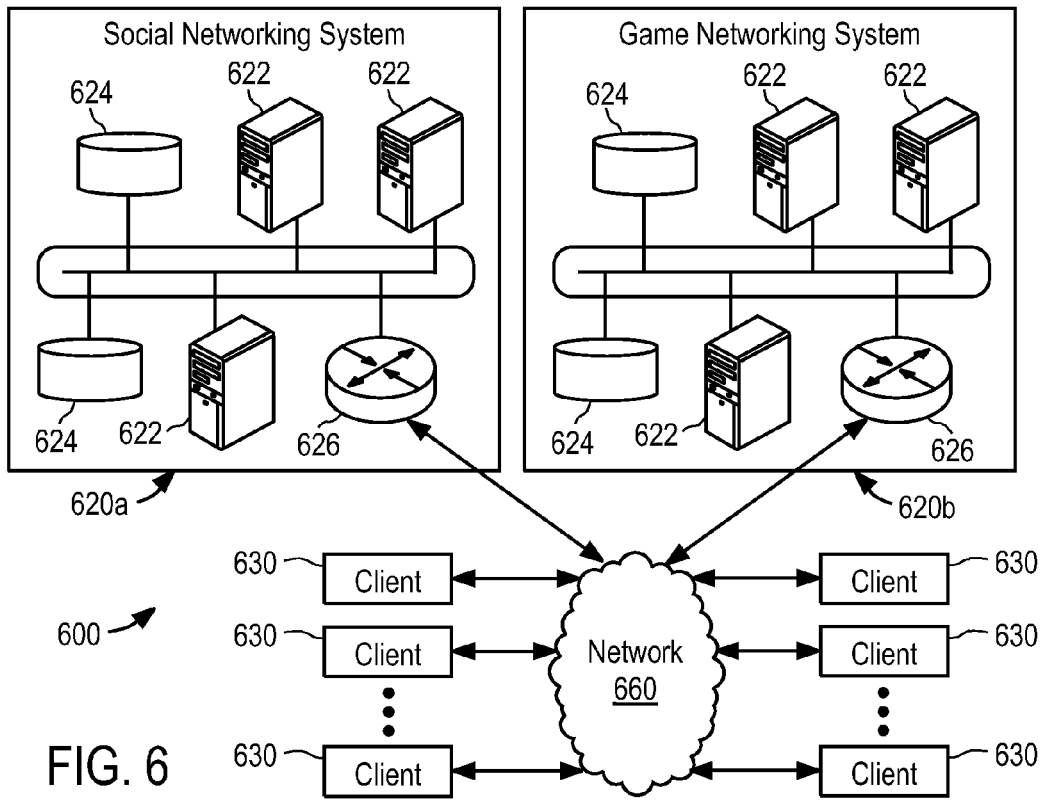
FIG. 6 illustrates an example embodiment of a network environment.

Particular embodiments may operate in a wide area network environment, such as the Internet, including multiple network addressable systems. FIG. 6 illustrates an example network environment, in which various example embodiments may operate. Network cloud 660 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 6 illustrates, particular embodiments may operate in a network environment comprising one or more networking systems, such as social networking system 620a, game networking system 620b, and one or more client systems 630. The components of social networking system 620a and game networking system 620b operate analogously; as such, hereinafter they may be referred to simply at networking system 620. Client systems 630 are operably connected to the network environment via a network service provider, a wireless carrier, or any other suitable means.

Networking system 620 is a network addressable system that, in various example embodiments, comprises one or more physical servers 622 and data stores 624. The one or more physical servers 622 are operably connected to computer network 660 via, by way of example, a set of routers and/or networking switches 626. In an example embodiment, the functionality hosted by the one or more physical servers 122 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 622 may host functionality directed to the operations of networking system 620. Hereinafter servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client computing device 630. The request may also include location information identifying a geographic location of the user's client system or a logical network location of the user's client system. The request may also include a timestamp identifying when the request was transmitted.

Although the example network environment described above and illustrated in FIG. 6 described with respect to social networking system 620a and game networking system 620b, this disclosure encompasses any suitable network environment using any suitable systems. As an example and not by way of limitation, the network environment may include online media systems, online reviewing systems, online search engines, online advertising systems, or any combination of two or more such systems.

Figure 7:
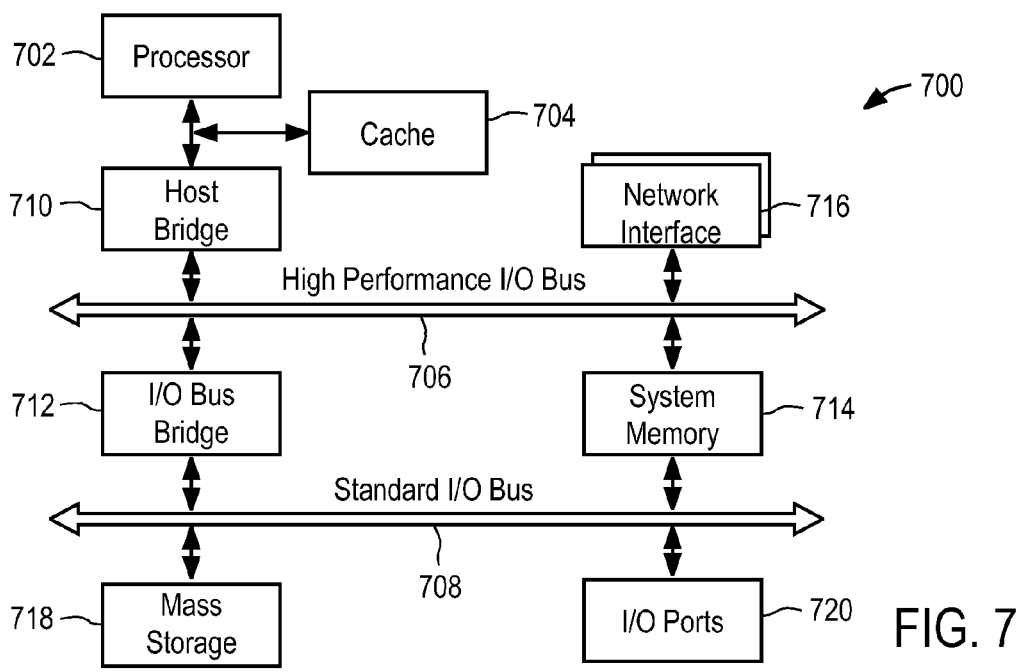
FIG. 7 illustrates an example embodiment of a computer system architecture.

FIG. 7 illustrates an example computing system architecture, which may be used to implement a server 622 or a client system 630. In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, etc. Mass storage 718 provides permanent storage for the data and programming instructions to perform the above-described functions implemented in servers 422, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
monitoring online engagements of a group of players of an online game during a training period;
using at least one processor to compute respective online engagement scores for the group of players based on how many days each respective player has played the online game within a subset of the training period;
assigning respective exponential weights to the online engagement scores so that the respective exponential weights of the online engagement scores increase with an increase in recency within the training period;
using the exponential weights to compute a group moving average, the group moving average comprising a weighted exponential moving group average of the online engagement scores of the group of players of the online game during the training period;
using the group moving average to determine an online engagement threshold value of a churn prediction model for the online game; and
applying the online engagement threshold value to a player moving average to determine a churn probability of a player for a prediction period outside the training period, the player moving average comprising a weighted exponential moving player average of an online engagement score of the player during an observation period within the training period.

2. The computer-implemented method of claim 1, wherein the observation period is shorter than the training period.

3. The computer-implemented method of claim 1, wherein the online engagement scores for the group of players are based on respective numbers of days per week the group of players played on the online game during the training period.

4. The computer-implemented method of claim 1, further comprising:
generating a message to the player to keep the player engaged in the online game when the churn probability of the player exceeds a predetermined churn probability threshold.

5. The computer-implemented method of claim 1, further comprising:
generating a message to the player to request the player to complete a task in the online game when the churn probability of the player exceeds a predetermined churn probability threshold.

6. The computer-implemented method of claim 1, further comprising: identifying another player connected to the player via a social network to help the player complete a task in the online game when the churn probability of the player exceeds a predetermined churn probability threshold; and
generating a message to the player to request help from said another player to complete the task in the online game.

7. The computer-implemented method of claim 1, further comprising:
generating a message to the player to promote another online game when the churn probability of the player exceeds a predetermined churn probability threshold.

8. An apparatus comprising:
an online engagement monitoring module configured to monitor online engagements of a group of players of an online game during a training period;
an online engagement score module configured to compute respective online engagement scores for the group of players based on how many days each respective player has played the online game within a subset of the training period;
a moving average computation module configured to assign respective exponential weights to the online engagement scores so that the respective exponential weights of the online engagement scores increase with an increase in recency within the training period, and to use the exponential weights to compute a group moving average, the group moving average comprising a weighted exponential moving average of the online engagement scores of the group of players of the online game during the training period;
a churn prediction module configured to use the group moving average to determine an online engagement threshold value of a churn prediction model for the online game;
a churn probability module configured to apply the online engagement threshold value to a player moving average to determine a churn probability of a player for a prediction period outside the training period, the player moving average comprising a weighted exponential moving-average of an online engagement score of the player during an observation period within the training period; and
a storage device coupled to the churn probability module, the storage device configured to store the group moving average, the player moving average, and the churn probability of the player for the prediction period.

9. The apparatus of claim 8, wherein the observation period is shorter than the training period.

10. The apparatus of claim 8, wherein the online engagement scores for the group of players are based on respective numbers of days per week the group of players played on the online game during the training period.

11. The apparatus of claim 8, further comprising:
a recommendation module configured to generate a message to the player to keep the player engaged in the online game when the churn probability of the player exceeds a predetermined churn probability threshold.

12. The apparatus of claim 8, further comprising:
a recommendation module configured to generate a message to the player to request the player to complete a task in the online game when the churn probability of the player exceeds a predetermined churn probability threshold.

13. The apparatus of claim 8, further comprising: a recommendation module configured to identify another player connected to the player via a social network to help the player complete a task in the online game when the churn probability of the player exceeds a predetermined churn probability threshold, and to generate a message to the player to request help from said another player to complete the task in the online game.

14. The apparatus of claim 8, further comprising:
a recommendation module configured to generate a message to the player to promote another online game when the churn probability of the player exceeds a predetermined churn probability threshold.

15. A non-transitory computer-readable storage medium storing a set of instructions that, when executed by a processor, cause the processor to perform operations, comprising:
monitoring online engagements of a group of players of an online game during a training period
computing respective online engagement scores for the group of players based on how many days each respective player has played the online game within a subset of the training period;
assigning respective exponential weights to the online engagement scores so that the respective exponential weights of the online engagement scores increase with an increase in recency within the using training period;
using the exponential weights to compute a group moving average, the group moving average comprising a weighted exponential moving group average of the online engagement scores of the group of players of the online game during the training period;
using the group moving average to determine an online engagement threshold value of a churn prediction model for the online game; and
applying the online engagement threshold value to a player moving average to determine a churn probability of a player for a prediction period outside the training period, the player moving average comprising a weighted exponential moving-average of an online engagement score of the player during an observation period within the training period.

16. The non-transitory computer-readable storage medium of claim 15, wherein the observation period is shorter than the training period.

17. The non-transitory computer-readable storage medium of claim 15, wherein the online engagement scores for the group of players are based on respective numbers of days per week the group of players played on the online game during the training period.

18. The non-transitory computer-readable storage medium of claim 15, further comprising:
generating a message to the player to promote another online game when the churn probability of the player exceeds a predetermined churn probability threshold.

19. The non-transitory computer-readable storage medium of claim 15, further comprising:
generating a message to the player to request the player to complete a task in the online game when the churn probability of the player exceeds a predetermined churn probability threshold.

20. The non-transitory computer-readable storage medium of claim 15, further comprising: identifying another player connected to the player via a social network to help the player complete a task in the online game when the churn probability of the player exceeds a predetermined churn probability threshold; and generating a message to the player to request help from said another player to complete the task in the online game.

* * * * *

UNITED STATES PATENT AND TRADEMARK OFFICE
CERTIFICATE OF CORRECTION

PATENT NO. : 8,790,168 B1  
APPLICATION NO. : 13/436315  
DATED : July 29, 2014  
INVENTOR(S) : Wolters et al.

Page 1 of 1

It is certified that error appears in the above-identified patent and that said Letters Patent is hereby corrected as shown below:

In the Specification,

In column 10, line 22, delete "535" and insert --525--, therefor

In column 15, line 34, after "network", insert --cloud--, therefor

In column 15, line 37, delete "122" and insert --622--, therefor

In column 16, line 64-65, delete "computing device" and insert --system--, therefor In the Claims, In column 19, line 25, in Claim 1, after "the", delete "¶", therefor Signed and Sealed this
Eighteenth Day of November, 2014

Michelle K. Lee
*Deputy Director of the United States Patent and Trademark Office*